UNITED STATES PATENT OFFICE.

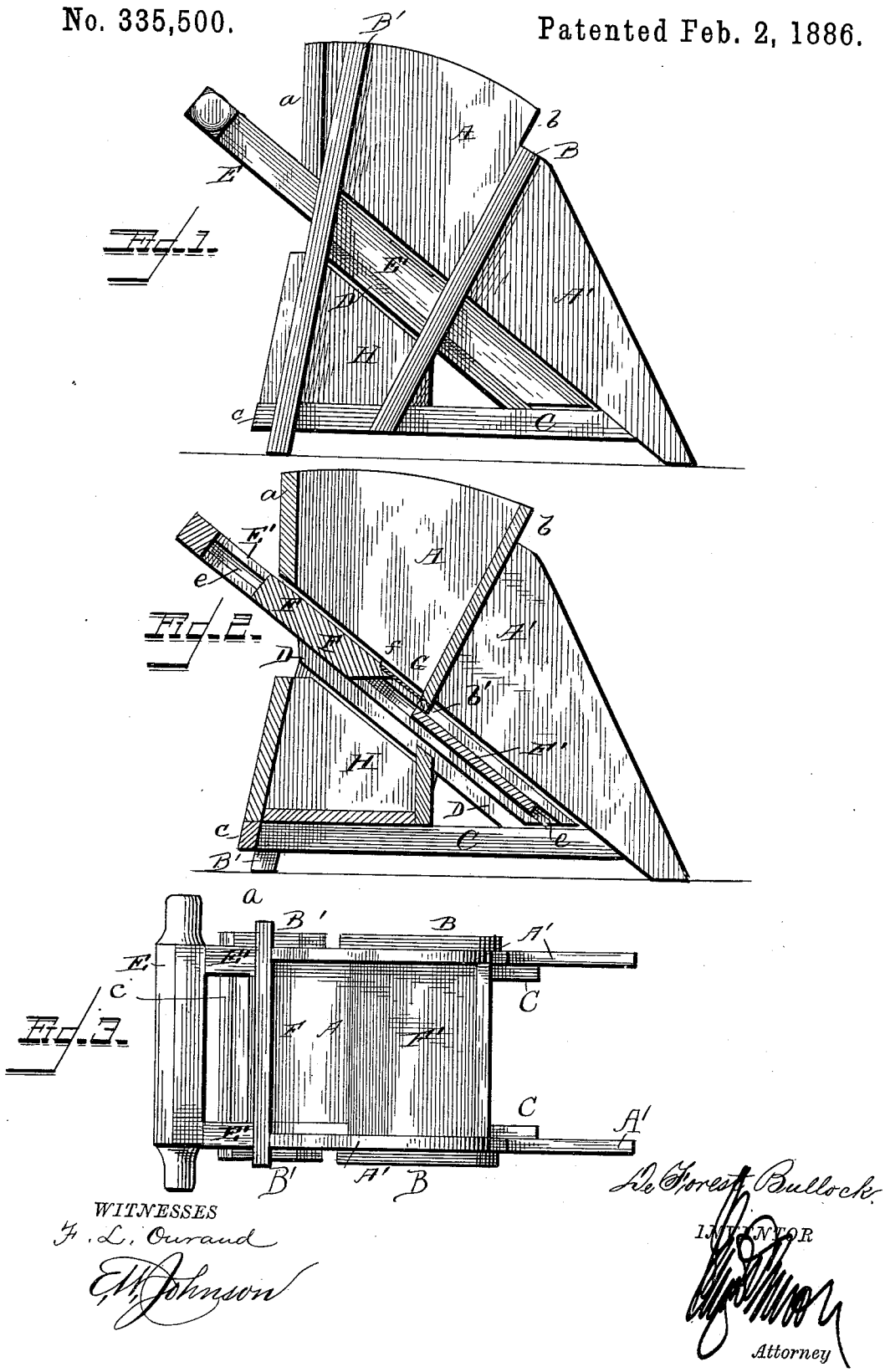

DE FOREST BULLOCK, OF SUMNER, WASHINGTON TERRITORY.

VEGETABLE-CUTTER.

SPECIFICATION forming part of Letters Patent No. 335,500, dated February 2, 1886.

Application filed July 23, 1885. Serial No. 172,458. (No model.)

*To all whom it may concern:*

Be it known that I, DE FOREST BULLOCK, a citizen of the United States of America, residing at Sumner, in the county of Pierce and Territory of Washington, have invented certain new and useful Improvements in Vegetable-Cutters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in vegetable-cutters; and it consists in the construction and combination of the parts, as will be hereinafter fully set forth, and specifically pointed out in the claim.

In the accompanying drawings, which illustrate my invention, Figure 1 is a side view of my improvement. Fig. 2 is a sectional view, and Fig. 3 is a top view.

A represents a suitable hopper, which is provided with a rear cross-piece or back, $a$, and an inclined front piece, $b$, said pieces being rigidly attached to the side pieces A', which extend downward, so as to form rests or supports. To the side pieces A' are rigidly attached braces B B', at the lower ends of which are secured sill-pieces C C, which are connected to each other at their rear by a cross-piece, $c$. Parallel to the under edges of the side pieces A' are attached bars D, which form a guide or bearing for the reciprocating slide E. The slide E consists of parallel side pieces E', which are recessed, as shown at $e$, and within these recesses are secured boards F F'. The board F is of the same thickness as the thickness of the side pieces, and it is beveled at its lower end, as fully shown in Fig. 2, above which beveled portion is formed a recess, $f$, within which will lie the knife-blade G, which knife-blade lies parallel to the upper edges of the side pieces E'. The board F' is of the same thickness as that of the recesses $e$, and does not extend upward beyond said recesses. The end board, $b$, of the hopper A depends beyond the opening in which the reciprocating slide E moves, the depending portion of the end piece, $b$, being indicated by $b'$.

H represents a receptacle or box, which when placed in position will rest upon the sills C C and the cross-piece $c$, said receptacle being adapted to receive the sliced or cut material as it is fed from the hopper.

The operation of my invention is as follows: The vegetables or roots to be cut are placed in the hopper A, and will collect by gravity in the lower portion thereof, and above the knife. When the handle is reciprocated, said knife will slice or cut the vegetables so that the cut pieces will fall into the box H. It will readily be seen that by the construction hereinbefore described the knife will act as it is reciprocated under the entire bottom opening in the hopper, and that the downward movement of said knife will be limited by coming in contact with the depending portion of the end board, $b$, and that by providing the slide E with a thin board, F', which moves in close proximity to the depending portion $b'$ of the board $b$, this depending portion will fill the space between the side pieces E', so as to prevent the vegetables falling out of what would be otherwise an opening, and when the slide is raised the vegetables will rest upon the board F', so as to be below the plane of the knife.

I am aware of the construction shown and described in United States Patent No. 225,114, dated March 2, 1880, and I do not claim, broadly, any feature disclosed in said patented construction.

I claim—

In a vegetable-cutter constructed substantially as described, the bottomless hopper A, having an end piece, $b$, with a depending portion, $b'$, in combination with the reciprocating slide E, having grooved sides receiving and retaining a bottom board, F, of the same thickness as the thickness of the side pieces of said slide, the lower end of said board being beveled and provided with a knife, and a board, F', also located in said grooves, and of less thickness than the side pieces of the slide, the parts being organized substantially as shown, and for the purpose set forth.

In testimony whereof I affix my signature in presence of two witnesses.

DE FOREST BULLOCK.

Witnesses:
JOHN BEVERLY,
PETER BELLES.